May 12, 1931.    G. P. LUCKEY    1,804,698
PRESSURE GAUGE
Filed Feb. 18, 1928
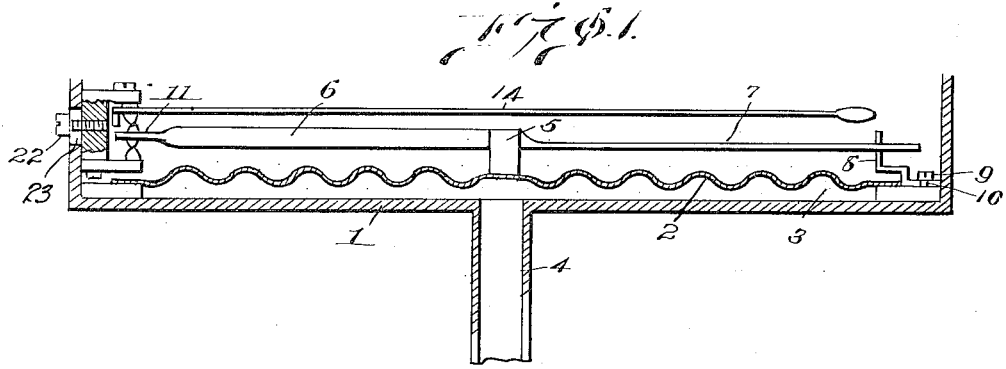
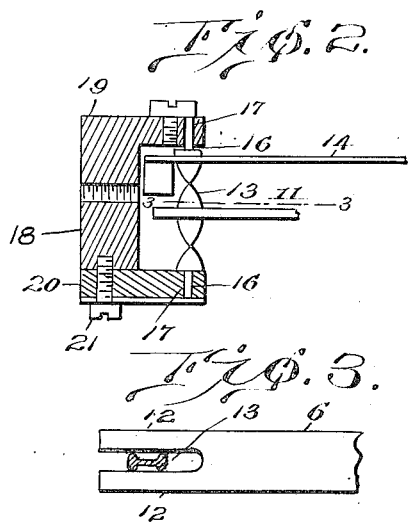
INVENTOR.
George P. Luckey
BY Robert H. Young
ATTORNEY.

Patented May 12, 1931

1,804,698

UNITED STATES PATENT OFFICE

GEORGE P. LUCKEY, OF LANCASTER, PENNSYLVANIA

PRESSURE GAUGE

Application filed February 18, 1928. Serial No. 255,327.

This invention relates to pressure gauges, and has for its object to provide a device of this class which embodies a simple construction for changing or correcting the extent of movement of the pointer for calibration purposes, and in which the zero adjustment of the pointer may be conveniently made.

With these objects in view, the invention consists of the mechanism and the coordination of the elements for carrying out my inventive purpose. The invention further consists of certain novel details of construction, and combination of parts, all of which will be first fully described and afterwards specifically pointed out in the appended claims.

Referring to the accompanying drawing:

Figure 1 is a sectional view partly in elevation illustrating a pressure gauge mechanism constructed in accordance with this invention, the dial not being shown;

Figure 2 is an enlarged vertical sectional view of the pointer actuating mechanism; and Figure 3 is a fragmentary plan view of the free end of the actuating arm taken on line 3—3 of Figure 2.

Like numerals of reference indicate the same parts throughout the several figures, in which:

1 indicates a casing within which a diaphragm 2 is mounted to form a chamber 3 between the diaphragm 2, and the casing 1. Communicating with said chamber is a pressure tube 4.

Mounted centrally of the diaphragm 2 is a post 5 carrying an arm 6 lying in a plane substantially parallel to the plane of the diaphragm 2. One portion of the said arm 6 may be a flat spring 7 which is held at its outer end by a clamp 8 slidably fixed in the casing 1 by a screw 9 passing through a slot 10 in the clamp 8. By means of this construction, the clamp 8 may be moved inwardly or outwardly of the spring portion 7 of the arm 6 in order to alter the extent of movement of the outer end 11 of the arm 6 for a given movement of the diaphragm 2.

Referring to Figures 2 and 3, it will be seen that the end 11 of the arm 6 is bifurcated to form two fingers 12, which snugly straddle a spiral shaft 13 fixed to the pointer 14; the spiral shaft 13 and pointer 14 having trunnions 16 entering bearings 17 formed in the frame 18. The said frame 18 includes an inverted L-shaped bracket 19 and a bottom plate 20 secured together by a screw 21, while a screw 22 passing through a slot 23 in the casing fastens the said frame 18 to the casing, and permits of a vertical adjustment of said frame with respect to the arm 6.

Having described the several parts of the invention, its operation is as follows:

Pressure or a minus pressure in the chamber 3 expands or retracts the diaphragm 2. In either instance the movement of the diaphragm is communicated to the arm 6, and as one end thereof is fixed by the clamp 8, the opposite or free end 11 thereof is moved along the spiral shaft 13, rotating the same and rotating the pointer 14 which is fixed to said spiral shaft. A calibrated dial (not shown) is associated with said pointer 14 as is usual in this class of instruments.

In order to change or correct the calibration by regulating the extent of movement of the free end 11 of the arm 6, the clamp 8 may be moved toward or away from the central post 5, while the zero position of the pointer 14 may be changed or corrected by raising or lowering the frame 18 with respect to the said arm 6.

Having thus described the invention I do not wish to be understood as limiting myself to the exact construction herein set forth, but I consider myself clearly entitled to all such changes and modifications that fall within the limit and scope of the appended claims.

Having thus described my invention what I claim as new and desire to secure by Letters Patent of the United States is:

1. A device of the character described including a casing, a diaphragm fixed therein to form a chamber in the casing, an arm mounted on the diaphragm in a plane substantially parallel to the plane of the diaphragm, one portion of the said arm being a spring, an adjustable clamp for holding the outer end of the spring portion of the arm relative to said casing, the other end of the arm being bifurcated to form two fingers, a pointer, means for rotatably mounting the same, said means including a spiral shaft lying in the bifurcated portion of the said arm and adapted to be snugly straddled by the said fingers thereof, a frame for said shaft, and means for adjusting the same with relation to the said arm.

2. A device of the character described including a casing, a diaphragm fixed therein to form a chamber in the casing, an arm mounted on the diaphragm in a plane substantially parallel to the plane of the diaphragm, one portion of the arm being a spring, an adjustable clamp for holding the outer end of the spring portion of the arm relative to said casing, the other end of the arm being bifurcated to form two fingers, a pointer, means for rotatably mounting the same, said means including a spiral shaft lying in the bifurcated portion of the said arm and adapted to be snugly straddled by the said fingers thereof.

3. A device of the character described including a casing, a diaphragm fixed therein to form a chamber in the casing, an arm mounted on the diaphragm, an adjustable clamp for holding one end of the arm relative to said casing, the other end of the arm being bifurcated to form two fingers, a pointer, means for rotatably mounting the same, said means including a spiral shaft lying in the bifurcated portion of the said arm and adapted to be snugly straddled by the fingers thereof.

4. A device of the character described including a casing, a diaphragm fixed therein to form a chamber in the casing, an arm mounted on the diaphragm, an adjustable clamp for holding one end of the arm the other end of the arm being bifurcated, a pointer, means for rotatably mounting the same, said means including a spiral shaft lying in the bifurcated portion of the said arm and adapted to be snugly straddled by the fingers thereof.

5. A device of the character described including a casing, a diaphragm fixed therein to form a chamber in the casing, an arm mounted on the diaphragm, a clamp for holding one end of the arm, a pointer, and means for rotatably mounting the same, said means including a spiral shaft adapted to be engaged by the other end of said arm and means cooperating with said casing for vertically adjusting said mounting means.

In testimony whereof I affix my signature.

GEORGE P. LUCKEY.